United States Patent [19]
Edamura et al.

[11] 3,862,974
[45] Jan. 28, 1975

[54] SUBSTITUTED PHENYLTHIO-THIOLACETATE ESTERS

[75] Inventors: Fred Y. Edamura; Lennon H. McKendry; Eric R. Larsen, all of Midland, Mich.

[73] Assignee: The Dow Chemical Company, Midland, Mich.

[22] Filed: Oct. 20, 1972

[21] Appl. No.: 299,288

Related U.S. Application Data

[62] Division of Ser. No. 111,688, Feb. 1, 1971, Pat. No. 3,709,926.

[52] U.S. Cl. ............................................. 260/455 R
[51] Int. Cl. ............................................. C07c 153/07
[58] Field of Search ............................... 260/455 R

[56] References Cited
UNITED STATES PATENTS

| | | | |
|---|---|---|---|
| 3,679,726 | 7/1972 | Kudamatsu | 260/455 R |
| 3,709,926 | 1/1973 | Edamura et al. | 260/455 R |

FOREIGN PATENTS OR APPLICATIONS

| | | | |
|---|---|---|---|
| 405,815 | 3/1965 | Japan | 260/455 R |

Primary Examiner—Lewis Gotts
Assistant Examiner—D. R. Phillips
Attorney, Agent, or Firm—Gary D. Street

[57] ABSTRACT

The present invention is directed to compounds corresponding to one of the formulas:

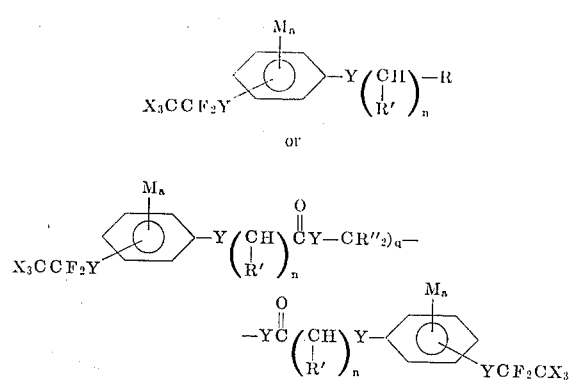

wherein
each X independently represents hydrogen, bromo, chloro or fluoro, with the proviso that at least one X is always bromo, chloro or fluoro;
each Y independently represents oxygen or sulfur;
each M independently represents bromo, chloro, fluoro, iodo, nitro or loweralkyl containing from one to about four carbon atoms, both inclusive;
$a$ represents an integer of from 0 to 3, both inclusive;
each $n$ independently represents an integer of from 1 to 6 both inclusive;
$q$ represents an integer of from 2 to 4, both inclusive;
R' represents hydrogen or loweralkyl containing from one to about four carbon atoms, both inclusive, with the proviso that when $n$ is greater than 1, only one R' can be loweralkyl;
each R'' independently represents hydrogen or loweralkyl containing from one to about four carbon atoms, with the proviso that when $q$ is greater than 2, only two R'' moieties can be loweralkyl, and
R represents

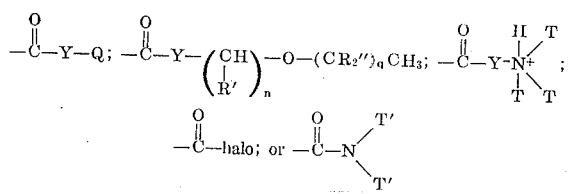

wherein
Q represents hydrogen, sodium, potassium or loweralkyl containing from one to about 10 carbon atoms, both inclusive;
halo represents bromo, chloro, fluoro or iodo;
each T independently represents hydrogen, lower-alkyl containing from one to about six carbon atoms, both inclusive or loweralkanol containing from one to about six carbon atoms, both inclusive;
each T' independently represents hydrogen, loweralkyl containing from one to about six carbon atoms, both inclusive, loweralkanol containing from one to about six carbon atoms, both inclusive or cyano, with the proviso that only one of T' is cyano;
R', R'', Y, $q$ and $n$ are as previously defined, and product complexes (1:1) of the compounds wherein Q is hydrogen with compounds wherein Q is sodium or potassium. The compounds of the present invention are suitable for use as herbicides, fungicides and insecticides.

3 Claims, No Drawings

SUBSTITUTED PHENYLTHIO-THIOLACETATE ESTERS

This is a division of application Ser. No. 111,688, filed Feb. 1, 1971.

SUMMARY OF THE INVENTION

The present invention is directed to a series of substituted phenoxy- and phenylthio- acetate compounds and derivatives thereof corresponding to one of the formulas:

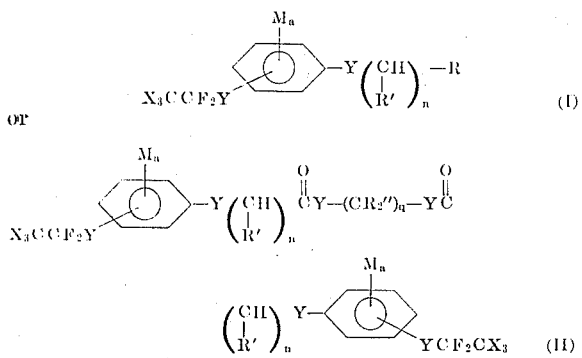

wherein, in the above succeeding formulas,
each X independently represents hydrogen, bromo, chloro or fluoro, with the proviso that at least one X is always bromo, chloro or fluoro;
each Y independently represents oxygen or sulfur;
each M independently represents bromo, chloro, fluoro, iodo, nitro or loweralkyl containing from one to about four carbon atoms, both inclusive;
$a$ represents an integer of from 0 to 3, both inclusive;
each $n$ independently represents an integer of from 1 to 6, both inclusive;
$q$ represents an integer of from 2 to 4, both inclusive;
R' represents hydrogen or loweralkyl containing from one to about four carbon atoms, both inclusive, with the proviso that when $n$ is greater than 1, only one R' can be loweralkyl;
each R'' independently represents hydrogen or loweralkyl containing from one to about four carbon atoms, with the proviso that when $q$ is greater than 2, only two R'' moieties can be loweralkyl, and
R represents

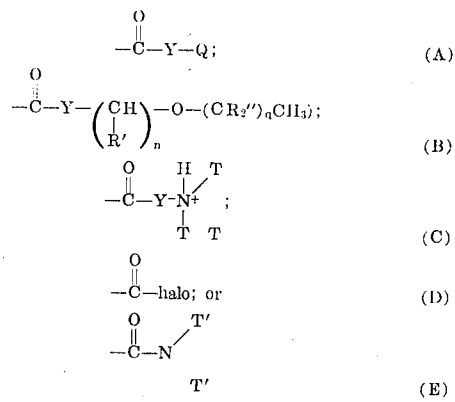

wherein
Q represents hydrogen, sodium, potassium or loweralkyl containing from one to about 10 carbon atoms, both inclusive;
halo represents bromo, chloro, fluoro or iodo;
each T independently represents hydrogen, loweralkyl containing from one to about six carbon atoms, both inclusive or loweralkanol containing from one to about six carbon atoms, both inclusive;
each T' independently represents hydrogen, loweralkyl containing from one to about six carbon atoms, both inclusive, lower alkanol containing from one to about six carbon atoms, both inclusive or cyano, with the proviso that only one of T' is cyano;
R', R'', Y, $q$ and $n$ are as previously defined, and product complexes (1:1) of the compounds wherein Q is hydrogen with compounds wherein Q is sodium potassium.

As used herein the term "loweralkyl" means saturated, monovalent aliphatic radicals, including straight and branched-chain radicals of from one to about four and from one to about 10 carbon atoms, as illustrated by, but not limited to, methyl, ethyl, propyl, isopropyl, butyl, sec.-butyl, pentyl, hexyl, heptyl, octyl, iso-octyl, nonyl, decyl and the like.

The term "loweralkanol" as used herein means saturated, monovalent aliphatic radicals, including straight and branched-chain radicals of from one to about six carbon atoms, as illustrated by, but not limited to, methanol, ethanol, propanol, isopropanol, butanol, sec.-butanol, pentanol, hexanol and the like.

The products of the present invention are oils or crystalline solids at room temperature and of varying degrees of solubility in water and many common organic solvents. The compounds of the present invention are suitable for use as herbicides, fungicides and insecticides.

The novel compounds corresponding to Formula (IA), wherein Q is loweralkyl, are generally prepared by reacting a substituted acetate compound of the formula:

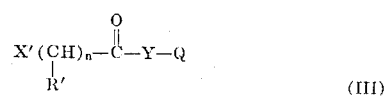

with a substituted phenol or thiophenol compound of the formula:

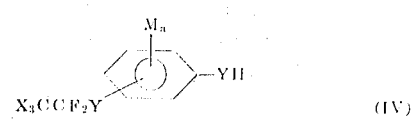

and potassium or sodium carbonate in the presence of an inert solvent which serves as a carrier medium. In the above formulas, X, Y, M, $a$, $n$, and R' are as previously defined, X' is bromo, chloro or fluoro, and Q is loweralkyl, Representative inert solvents operable as carrier media in the present invention include carbon tetrachloride, acetonitrile, dimethylformamide, chloroform, acetone, benzene, and the like.

The reaction takes place smoothly at temperatures of from about 0° to about 120°C.; generally, the reaction is carried out at the boiling point of the reaction mixture under reflux conditions. The amount of the reactants employed is not critical and essentially equimolar proportions of the reactants are employed. The pressure is not critical and the reaction is ordinarily carried out at ambient atmospheric pressures.

In carrying out the reaction, the phenol or thiophenol and sodium or potassium carbonate reactants are mixed in a carrier medium as described and the substituted acetate reactant added thereto at ambient temperatures. The resulting reaction mixture is heated gently at the boiling point of the reaction mixture under reflux conditions for a period of from about 2 to about 25 hours. Following the substantial completion of the reaction, the reaction mixture is cooled and filtered, and the solvent carrier removed in vacuo to obtain the product as an oily residue. The product residue thus obtained can be further purified by employing conventional techniques, such as, for example, distillation, vapor phase chromataography and the like.

Other novel compounds of the present invention corresponding to Formula (IB) and those compounds corresponding to Formula II are similarly prepared by reacting a substituted phenol or thiophenol reactant with an appropriately substituted acetate or thioacetate reactant and sodium or potassium carbonate under the reaction conditions set forth above. Suitable substituted acetate reactants operable in this embodiment of the present invention include, for example, ethylene glycol bis(chloroacetate), tetramethylene glycol bis(chloroacetate), hexamethylene glycol bis(chloroacetate), dimethylethylene glycol bis(chloroacetate), 1-isobutoxy-2-propyl chloroacetate and the like, including the corresponding thioacetate compounds. The above acetate compounds are commercially available or readily prepared by known procedures from chloroacetyl chloride and appropriate glycol or alkanol reactant.

The prepared products of Formula (IA), wherein Q is loweralkyl, can be further treated with Claisen's alkali to obtain the novel compounds of Formula (IA) wherein Q is sodium or potassium. The addition of Claisen's alkali to such prepared products results in the formation of a slurry which, after a period of from about 5 to about 15 minutes, is clarified by the addition of small portions of water. The clarified solution is then agitated at ambient temperatures for a period of from about 1 to about 4 hours and subsequently extracted with methylene chloride. Evaporation of the aqueous phase from the extract under reduced pressure gives the desired sodium or potassium derivative of the substituted phenoxy- or phenylthio- acetate compound as a crystalline solid. The product thus obtained can be further purified by employing procedures such as solvent extraction, recrystallization and the like.

Product complexes (1:1) comprising the prepared sodium or potassium derivatives of the substituted phenoxy- or phenylthio- acetate compounds with a substituted phenoxy- or phenylthio- acetic acid compound are readily prepared by acidifying a solution of the sodium or potassium derivative obtained above with 5 percent sulfuric acid. The product precipitate formed upon acidification is filtered off and washed with water to give the desired 1:1 product complex as a crystalline solid which can be further purified according to procedures previously described. Further treatment of the 1:1 product complex thus obtained with 3N sulfuric acid at ambient temperatures for a period of about two hours, followed by filtration and washing and drying of the product gives the free acetic or thioacetic acid compound corresponding to Formula (IA) wherein Q is hydrogen.

In a further embodiment of the present invention, the substituted phenoxy- or phenylthio- acetic or thioacetic acid compounds obtained above are employed in the preparation of the novel compounds of Formula (IC) and (ID).

In preparing the compounds of Formula (IC), the substituted phenoxy- or phenylthio- acetic or thioacetic acid compound is dispersed in a carrier medium, such as one of those set forth hereinbefore, and an appropriate amine reactant is added thereto. Representative amine reactants operable in this embodiment of the present invention include methylamine, n-propylamine, sec.-butylamine, n-amylamine, hexylamine, dimethylamine, dibutylamine, dihexylamine, triethylamine, tributylamine, trihexylamine, ethanolamine, triethanolamine, 2-amino-1-butanol, 2-amino-2-methyl-1-propanol and the like.

The resulting reaction mixture of the amine and acetic or thiocetic acid reactants is usually agitated at ambient temperatures for a period of from about one-half to about two hours. Following the completion of the reaction, the product precipitate formed during the course of the reaction is filtered off, washed with an appropriate organic solvent and dried to give the desired product corresponding to Formula (IC). Further purification of the product can be achieved by utilizing methods previously described.

In preparing the novel compounds corresponding to Formula (ID), the substituted phenoxy- or phenylthioacetic or thioacetic acid compound is contacted with a thionyl chloride or bromide reactant and the resulting reaction mixture is heated at a temperature of from about 50 to about 100°C. for a period of from about 1 to about 25 hours. Preferably, the reaction mixture is heated at the boiling point under reflux conditions. Following the completion of the reaction, the reaction mixture is evaporated under reduced pressure to remove the excess thionyl halide reactant and then distilled to obtain the desired substituted phenoxy- or phenylthio- acetyl halide product. The product thus obtained can be further purified according to the procedures set forth hereinbefore.

The acyl fluorides or iodides can be prepared by the reaction of the corresponding acyl chloride with calcium iodide or antimony fluoride, respectively. In an additional embodiment of the present invention, the novel compounds of Formula I wherein R is

(E)

are prepared by adding a solution containing a substituted phenoxy- or phenylthio- acyl halide compound of Formula (ID) in a carrier medium as previously set forth to a solution containing cyanamide or an appropriate amine reactant as previously set forth. The resulting reaction mixture is agitated at a temperature of from about 50 to about 120°C. for a period of from about 1 to about 25 hours. Preferably, the reaction is carried out at the boiling temperature of the reaction mixture under reflux conditions. Following the substantial completion of the reaction, the reaction mixture is filtered and treated with water methylene chloride, the aqueous layer formed being separated and extracted with additional portions of methylene chloride. The methylene chloride portions are combined, washed with water, and dried over magnesium sulfate. Evaporation of the product mixture under reduced pressure gives the desired product corresponding to Formula (IE), which can be further purified as previously described.

The compounds of Formula (IE) wherein each T' represents hydrogen are prepared by reacting a mixture consisting of a compound of Formula (IA), wherein Q is loweralkyl, and an alkanol, such as, for example, methanol, ethanol and the like with concentrated ammonium hydroxide. The ammonium hydroxide reactant is added, by dropwise addition, to the prepared mixture at a temperature of from about 0° to about 5°C. over a period of from about 5 to about 15 minutes. The resulting reaction mixture is agitated at ambient temperatures for a period of from about 10 to about 20 hours. Following the completion of the reaction, the reaction mixture is filtered and the solids obtained dissolved in methylene chloride. The aqueous filtrate is extracted with additional portions of methylene chloride and the methylene chloride portions are combined, washed with water and dried over magnesium sulfate. Reduction of the product mixture volume by evaporation under reduced pressure, followd by the addition of hexane yields the product as a crystalline solid which is filtered off and further purified as previously described.

The desirable properties of the products of the present invention are inherent in the pure compounds; when highly selective properties are to be relied upon, the purified compounds will be preferred. However, for many applications, incompletely purified products can be utilized if desired.

DESCRIPTION OF THE PREFERRED EMBODIMENTS

The following examples illustrate the present invention but as such are not to be construed as limiting the same.

EXAMPLE 1

2-Chloro-5-(2,2-dichloro-1,1-difluoroethoxy)phenol (251.6 grams; 0.9 mole) and potassium carbonate (125 grams; 0.9 mole) were dissolved in one liter of acetonitrile. Ethyl bromoacetate (167.0 grams: 1.0 mole) was added at ambient temperatures and the resulting reaction mixture was heated gently at the boiling temperature under reflux conditions for about 20 hours. Following the completion of the reaction, the reaction mixture was cooled and filtered, and the acetonitrile solvent removed in vacuo to obtain the product as an oily residue. Distillation of the product residue gave the desired ethyl 2-chloro-5-(2,2-dichloro-1,1-difluoroethoxy)phenoxyacetate compound as an oil having a refractive index ($n_D^{25}$) of 1.5014.

EXAMPLE 2

A reaction mixture consisting of 2-chloro-5-(2,2-dichloro-1,1-difluoroethoxy)phenol (8.3 grams; 0.03 mole), potassium carbonate (5.0 grams), acetonitrile (80 milliliters) and 1-isobutoxy-2-propyl chloroacetate (6.9 grams; 0.03 mole) was heated at the boiling temperature under reflux conditions for a period of about 20 hours in order to assure substantial completion of the reaction. Following the completion of the reaction, the reaction mixture was filtered and the solvent removed in vacuo to give the desired 2-(isobutoxy)-1-methylethyl 2-chloro-5-(2,2-dichloro-1,1-difluoroethoxy)phenoxyacetate product as an oil having a refractive index ($n_D^{25}$) of 1.4386.

EXAMPLE 3

In a manner similar to that described in Example 2, ethylene bis(2-chloro-5-(2,2-dichloro-1,1-difluoroethoxy)-phenoxyacetate) is obtained as a yellow viscous oil having a refractive index ($n_D^{25}$) of 1.5083 by reacting together 2-chloro-5-(2,2-dichloro-1,1-difluoroethoxy)phenol, potassium carbonate and ethylene glycol bis(chloroacetate) in acetonitrile.

EXAMPLE 4

The product obtained in Example 1 (10.9 grams; 0.03 mole) was treated with 75 milliliters of Claisen's alkali (0.033 mole of potassium hydroxide in a 4:1 methanol/water solution) at ambient temperatures for a period of about 10 minutes. The resulting slurry was clarified by the addition of approximately 20 milliliters of water and the clarified solution was agitated at ambient temperatures for a period of about two hours. The solution was then washed twice with methylene chloride and evaporated to dryness under reduced pressure to obtain the product as a solid residue. Recrystallization of the product residue from methanol gave the desired potassium 2-chloro-5-(2,2-dichloro-1,1-difluoroethoxy)phenoxyacetate compound as a crystalline solid having a melting point of 255°–257°C.

EXAMPLE 5

The potassium derivative (5.4 grams; 0.015 mole) obtained in Example 4 was dissolved in 80 milliliters of water and acidified with 5 percent sulfuric acid. The product precipitate formed upon acidification was filtered off, washed with water, dried and recrystallized from acetone to give the desired 1:1 product complex of potassium 2-chloro-5-(2,2-dichloro-1,1-difluoroethoxy)phenoxyacetate with 2-chloro-5-(2,2-dichloro-1,1-difluoroethoxy)phenoxy acetic acid as a white crystalline solid having a melting point of 198°–199°C.

EXAMPLE 6

The 1:1 product complex obtained in Example 5 (9.54 grams; 0.135 mole) was slurried with 3N sulfuric acid (100 milliliters) at ambient temperatures for a period of about 2 hours. The reaction mixture was then filtered and the product precipitate obtained was washed with water and dried to give the desired 2-chloro-5-(2,2-dichloro-1,1-difluoroethoxy)phenoxy acetic acid product as a white crystalline solid having a melting point of 92°–97°C.

By reacting the appropriate substituted haloalkoky or haloalkylthio- phenol or thiophenol reactant with an appropriate substituted acetate reactant and sodium or potassium carbonate according to the procedures of Examples 1–3, and by treating such products according to the procedures of Examples 4–6, the following substituted phenoxy- and phenylthio- acetate compounds and derivatives thereof are obtained:

Ethyl 3-(2,2-dichloro-1,1-difluoroethoxy)phenoxyacetate, having a boiling point of 130°C. at 0.2 millimeters of Hg.;

Ethyl 4-(2,2-dichloro-1,1-difluoroethoxy)phenoxyacetate, having a melting point of 70.5°–71°C.;

Ethyl 4-(2,2-dichloro-1,1-difluoroethoxy)-2-nitrophenoxyacetate, having a boiling point of 183°C. at 0.2 millimeters of Hg.;

Ethyl 2,4,6-trichloro-5-(2,2-dichloro-1,1-difluoroethoxy)phenoxyacetate, having a boiling point of 166°–170°C. at 0.2 millimeters of Hg.;

Ethyl 2-bromo-5-(2,2-dichloro-1,1-difluoroethoxy)phenoxyacetate, having a boiling point of 154°–160°C. at 0.2 millimeters of Hg.;

Ethyl 2-(2,2-dichloro-1,1-difluoroethoxy)phenoxyacetate, having a boiling point of 104°–106°C. at 0.5 millimeters of Hg.;

Ethyl 3-(2-bromo-1,1,2-trifluoroethoxy)phenoxyacetate, having a boiling point of 114°–115°C. at 0.1 millimeters of Hg.;

Ethyl 4-chloro-2-(2,2-dichloro-1,1-difluoroethoxy)phenoxyacetate, having a boiling point of 122°–126°C. at 0.02 millimeters of Hg.;

Butyl 2-chloro-5-(2,2-dichloro-1,1-difluoroethoxy)phenoxyacetate, having a boiling point of 152°–154°C. at 0.2 millimeters of Hg.;

Ethyl 2-(2-chloro-5-(2,2-dichloro-1,1-difluoroethoxy)-phenoxypropionate, having a boiling point of 120°–124°C. at 0.1 millimeters of Hg.;

Isooctyl 2-chloro-5-(2,2-dichloro-1,1-difluoroethoxy)phenoxyacetate, having a boiling point of 170°C. at 0.15 millimeters of Hg.;

Ethyl 4-(2-chloro-5-(2,2-dichloro-1,1-difluoroethoxy)phenoxy)butyrate, having a boiling point of 150°–155°C. at 0.1 millimeters of Hg.;

Ethyl 2(and 6)-(2,2-dichloro-1,1-difluoroethoxy)-p(and-m)-tolyloxyacetate, as a 1:1 mixture having a boiling point of 120°C. at 0.2 millimeters of Hg.;

2-Isobutoxy-1-methylethyl 2-chloro-5-(2,2-dichloro-1,1-difluoroethoxy)phenoxyacetate, having a refractive index ($n_D^{25}$) of 1.4386;

Ethylene bis (2-chloro-5-(2,2-dichloro-1,1-difluoroethoxy)phenoxyacetate), having a refractive index ($n_D^{25}$) of 1.5083;

Decyl 2-(5-(2,2,2-trichloro-1,1-difluoroethoxy)-2-iodophenylthio)-3,3-dimethylthiobutyrate, having a molecular weight of 689.93;

Ethyl 4-(4-(2-bromo-1,1,2-trifluoroethylthio)-2,6-difluorophenoxy)thiobutyrate, having a molecular weight of 453.30;

Propyl 3-(2-bromo-4-(2,2,2-tribromo-1,1-difluoroethoxy)-6-tert.-butylphenylthio)propionate, having a molecular weight of 676.07;

Butyl 3-chloro-5-bromo-2-(2,2-dibromo-1,1-diluoroethoxy)phenylthioacetate, having a molecular weight of 575.51;

Isobutyl 3-(3-(2,2,2-trichloro-1,1-difluoroethoxy)-2-iodo-4-tert.-butyl-6-nitrophenoxy)-2-methylpropionate, having a molecular weight of 646.68;

Propyl 3-(4-bromo-3-(2-bromo-1,1,2-trifluoroethoxy)-2,6-dinitrophenoxy)thiopropionate, having a molecular weight of 570.15;

Isooctyl 2-bromo-4-chloro-5-(2,2,2-tribomo-1,1-difluoroethoxy)-6-iodophenoxyacetate, having a molecular weight of 820.35;

Isoamyl 2-(2-(2,2-dibromo-1,1-difluoroethylthio)-3,5-dipropylphenoxy)valerate, having a molecular weight of 602.43;

Potassium 4-(2,4,6-tribomo-3-(2,2-dibromo-1,1-difluoroethylthio)phenylthio)thiobutyrate, having a molecular weight of 741.03;

Sodium 2-(2,2,2-trichloro-1,1-difluoroethoxy)-3,5-diiodophenoxyacetate, having a molecular weight of 609.30;

Potassium 5-(4-(2-bromo-1,1,2-trifluoroethylthio)-2,6-difluorophenylthio)thiovalerate, having a molecular weight of 493.43;

Sodium 3-(4-(2,2,2-tribromo-1,1-difluoroethoxy)-2-tert.-butyl-6-iodophenoxy)propionate, having a molecular weight of 686.90;

Potassium 3-bromo-5-chloro-2-(2-bromo-1,1-difluoroethylthio)phenoxythioacetate, having a molecular weight of 494.66;

Potassium 3-(2,2-dibromo-1,1-difluoroethoxy)-2,6-dinitro-4-iodophenylthioacetate, having a molecular weight of 660.04;

Sodium 3-(2-bromo-4-chloro-5-(2,2,2-trichloro-1,1-difluoroethoxy)-6-fluorophenoxy)-4,4'-dimethylvalerate, having a molecular weight of 558.97;

Potassium 4-bromo-3-(2,2,2-tribromo-1,1-difluoroethoxy)-2,6-di-tert.-butylphenoxythioacetate, having a molecular weight of 714.16;

Sodium 5-(3-(2,2-dibromo-1,1-difluoroethoxy)-2,4,6-triethylphenoxy)valerate, having a molecular weight of 538.21;

Potassium 2-bromo-3-(2,2-dichloro-1,1-difluoroethylthio)-4-tert.-butyl-6-nitrophenoxyacetate, having a molecular weight of 535.24;

4-(2,4,6-Tribromo-3-(2,2-dibromo-1,1-difluoroethylthio)phenylthio)butyric acid (1:1) with potassium 3-(2,2-dibromo-1,1-difluoroethoxy)-2,6-dinitro-4-iodophenylthioacetate, having a molecular weight of 1362.98;

2-(2,2,2-Trichloro-1,1-difluoroethoxy)-3,5-diiodophenoxy acetic acid (1:1) with sodium 3-(4-(2,2,2-tribromo-1,1-difluoroethoxy)-2-tert.-butyl-6-iodophenoxy)propionate, having a molecular weight of 1274.22;

5-(4-(2-bromo-1,1,2-trifluoroethylthio)-2,6-difluorophenylthio)thiovaleric acid (1:1) with potassium 3-bromo-5-chloro-2-(2-bromo-1,1-difluoroethylthio)phenoxythioacetate, having a molecular weight of 949.99;

3-(2-Bromo-4-chloro-5-(2,2,2-trichloro-1,1-difluoroethoxy)-6-fluorophenoxy-4,4'-dimethylvaleric acid (1:1) with sodium 5-(3-(2,2-dibromo-1,1-difluoroethoxy)-2,4,6-triethylphenoxy)valerate, having a molecular weight of 1075.21;

3-(2,2-dibromo-1,1-difluoroethoxy)-2,6-dinitro-4-iodophenylthio acetic acid (1:1) with potassium 4-bromo-3-(2,2,2-tribromo-1,1-difluoroethoxy)-2,6-di-tert.-butylphenoxythioacetate, having a molecular weight of 1336.11;

5-(3-(2,2-Dibromo-1,1-difluoroethoxy)-2,4,6-triethylphenoxy)valeric acid (1:1) with potassium 2-bromo-3-(2,2-dichloro-1,1-difluoroethylthio)-4-tert.-butyl-6-nitrophenoxyacetate, having a molecular weight of 1051.77;

2-Bromo-3-(2,2-dichloro-1,1-difluoroethylthio)-4-tert.-butyl-6-nitrophenoxy acetic acid (1:1) with potassium 2-chloro-5-(2,2-dichloro-1,1-difluoroethoxy)phenoxyacetate, having a molecular weight of 870.76;

4-(2,4,6-Tribromo-3-(2,2-dibromo-1,1-difluoroethylthio)phenylthio)butyric acid, having a molecular weight of 702.94;

2-(2,2,2-Trichloro-1,1-difluoroethoxy)-3,5-diiodophenoxy acetic acid, having a molecular weight of 587.31;

5-(4-(2-Bromo-1,1,2-trifluoroethylthio)-2,6-difluorophenylthio)thiovaleric acid, having a molecular weight of 455.33;

3-(2-Bromo-4-chloro-5-(2,2,2-trichloro-1,1-difluoroethoxy)-6-fluorophenoxy)-4,4'-dimethylvaleric acid, having a molecular weight of 536.99;

3-(2,2-Dibromo-1,1-difluoroethoxy)-2,6-dinitro-4-iodophenylthio acetic acid, having a molecular weight of 621.94;

5-(3-(2,2-Dibromo-1,1-difluoroethoxy)-2,4,6-triethylphenoxy)valeric acid, having a molecular weight of 516.23;

2-Bromo-3-(2,2-dichloro-1,1-difluoroethylthio)-4-tert.-butyl-6-nitrophenoxy acetic acid, having a molecular weight of 497.15;

4-(3,4,4-trimethylamyloxy)-2-methylbutyl 3-(2,4,6-tribromo-5-(2,2-dibromo-1,1-difluoroethylthio)propionate, having a molecular weight of 871.20;

2-(Isobutoxy)-1-methylethyl 2-(5-(2,2,2-trichloro-1,1-difluoroethoxy)-2-iodophenoxy)-3,3-dimethylthiobutyrate, having a molecular weight of 647.78;

2-(Ethoxy)-2-methylpropyl 4-(4-(2-bromo-1,1,2-trifluoroethylthio)-2,6-difluorophenoxy)thiobutyrate, having a molecular weight of 525.40;

2-(Amyloxy)ethyl 4-(2,2,2-tribromo-1,1-difluoroethoxy)-2-nitro-6-tert.-butylphenylthio acetate, having a molecular weight of 700.25;

6-(Ethoxy)-3-ethylhexyl 3-(3-chloro-5-bromo-2-(2,2-dichloro-1,1-difluoroethoxy)phenylthio)thiopropionate, having a molecular weight of 616.85;

2-(Isohexoxy)-1-methylethyl 3-(2-bromo-1,1,2-trifluoroethoxy)-2-iodo-4-tert.-butyl-6-nitrophenoxyacetate, having a molecular weight of 698.32;

4-(Isopropoxy)-3-propylbutyl-3-(4-bromo-3-(2,2-dichloro-1,1-difluoroethoxy)-2,6-dinitrophenylthio)-2-methylpropionate, having a molecular weight of 670.36;

2-(Isobutoxy)ethyl 2-bromo-4-chloro-3-(2,2,2-tribromo-1,1-difluoroethylthio)-6-iodophenoxythioacetate, having a molecular weight of 840.42;

4-(butoxy)-2,2-dimethylbutyl 4-(2-(2,2-dibromo-1,1-difluoroethoxy)-3,5-dipropylphenoxy)butyrate, having a molecular weight of 658.47;

Tetramethylene bis(3-(2,4,6-tribromo-3-(2,2-dibromo-1,1-difluoroethoxy)phenylthio)thiopropionate), having a molecular weight of 1399.8;

1,2-Dimethylethylene bis(4(2-(2,2,2-trichloro-1,1-difluoroethylthio)-3,5-diiodophenoxy)-3-methylbutyrate), having a molecular weight of 1345.1;

2,3-Diethyltetramethylene bis(4-(2-bromo-1,1,2-trifluoroethoxy)-2,6-difluorophenoxyacetate), having a molecular weight of 840.3;

2-Methyltrimethylene bis(3-(4-(2,2-dibromo-1,1-difluoroethylthio)-2-iodo-6-tert.-butylphenylthio)-2-isopropylthiopropionate), having a molecular weight of 1406.5;

Trimethylene bis(3-bromo-5-chloro-2-(2,2,2-trichloro-1,1-difluoroethoxy)phenoxyacetate), having a molecular weight of 937.7;

1,3-Diethyltrimethylene bis(4-(2-(2,2-dichloro-1,1-difluoroethylthio-2,6-dinitro-4-iodophenylthio)butyrate), having a molecular weight of 1248.4;

2-Isopropyltrimethylene bis(2-bromo-4-chloro-5-(pentafluoroethoxy)-6-fluorophenoxyacetate), having a molecular weight of 949.1;

Ethylene bis(3-(4-bromo-3-(2,2-dichloro-1,1-difluoroethoxy)-2,6-di-tert.-butylphenoxy)-2-methylpropionate), having a molecular weight of 1064.3

Trimethylene bis(3-(2,2,2-trichloro-1,1-difluoroethoxy)-2,4,6-triethylphenoxyacetate), having a molecular weight of 879.5; and 1,2-Dimethylethylene bis(3-(2-chloro-5-(2,2-dibromo-1,1-difluoroethoxy)-4-ethyl-6-nitrophenylthio)thiopropionate), having a molecular weight of 1141.4.

EXAMPLE 7

2-Chloro-5-(2,2-dichloro-1,1-difluoroethoxy)-phenoxy acetic acid (2.5 grams; 0.007 mole) was dissolved in benzene (20 milliliters); the mixture was then treated with ethanolamine (0.61 grams; 0.01 mole) and the resulting reaction mixture was agitated at ambient temperatures for a period of about one hour. The product precipitate formed during the course of the reaction was filtered off, washed with benzene and dried to give the desired 2-aminoethanol salt of 2-chloro-5-(2,2-dichloro-1,1-difluoroethoxy)phenoxy acetic acid as a solid having a melting point of 91°–94°C.

In a manner similar to that described in Example 7, there are obtained, inter alia, the following products of Formula I wherein R is

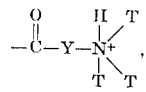

by the reaction of the appropriate substituted phenoxy acetic acid derivative with the appropriate amine compound:

Dibutylamine salt of 2-chloro-5-(2,2-dichloro-1,1-difluoroethoxy)phenoxy acetic acid, having a melting point of 99°–103°C.;

Dimethylamine salt of 2-chloro-5-(2,2-dichloro-1,1-difluoroethoxy)phenoxy acetic acid, having a molecular weight of 380.607;

Tripropylamine salt of 3-(2,4,6-tribromo-3-(2,2,2-trichloro-1,1-difluoroethoxy)phenylthio)thiopropionic acid, having a molecular weight of 761.6;

Triisopropanolamine salt of 4-(2-(2-(bromo-1,1,2-trifluoroethylthio)-3,5-diiodophenoxy)butyric acid, having a molecular weight of 816.3;

Isohexylamine salt of 4-(2,2,2-tribromo-1,1-difluoroethoxy)-2,6-difluorophenoxyacetic acid, having a molecular weight of 606.1;

4-Amino-2-methyl-1-butanol salt of 3-(4-(pentafluoroethoxy)-2-iodo-6-tert.-butylphenylthio)-2-methylthiopropionic acid, having a molecular weight of 617.5;

Diethanolamine salt of 3-(3-bromo-5-chloro-2-(2,2-dichloro-1,1-difluoroethylthio)phenoxy)-2-isopropylpropionic acid, having a molecular weight of 591.8;

N-methyl-N-isoamylamine salt of 5-(3-(2-bromo-1,1,2-trifluoroethoxy)-2-iodo-4-nitro-6-tert.-butylphenylthio)-4-methylvaleric acid, having a molecular weight of 729.4;

Ammonium salt of 3-(4-bromo-3-(pentafluoroethoxy)-2,6-dinitrophenoxy)thiopropionic acid, having a molecular weight of 502.4;

Isobutylamine salt of 2-bromo-4-chloro-3-(2,2,2-tribromo-1,1-difluoroethylthio)-6-iodophenoxyacetic acid, having a molecular weight of 798.3; and Dibutylamine salt of 3-(2-(2,2-dichloro-1,1-difluoroethoxy)-3,5-dipropylphenoxy)-2-tert.- butylpropionic acid, having a molecular weight of 584.6.

EXAMPLE 8

A reaction mixture consisting of 2-chloro-5-(2,2-dichloro-1,1-difluoroethoxy)phenoxy acetic acid (9.9 grams; 0.03 mole) and thionyl chloride (18.0 grams; 0.15 mole) was heated at the boiling temperatures under reflux conditions for a period of about 20 hours. Following the completion of the reaction, the reaction mixture was evaporated under reduced pressure to remove the excess thionyl chloride reactant and then distilled to give the desired 2-chloro-5-(2,2-dichloro-1,1-difluoroethoxy)phenoxy acetyl chloride product as a colorless oil having a refractive index ($n_D^{25}$) of 1.5180 and a boiling point of 117°C. at 0.2 millimeters of Hg.

In a manner similar to that described in Example 8, there are obtained, inter alia, the following acetyl halide products of Formula (ID) by the reaction of the appropriate substituted phenoxy acetic acid and thionyl halide reactants:

3(2-bromo-5-(2,2,2-trichloro-1,1-difluoroethylthio)-phenylthio)propionyl bromide, having a molecular weight of 523.7;

2-(5-(2-bromo-1,1,2-trifluoroethoxy)-2-iodophenoxy)-propionyl fluoride, having a molecular weight of 471.0;

4-(2,2,2-tribromo-1,1-difluoroethylthio)-2,6-difluorophenylthio acetyl chloride, having a molecular weight of 555.5;

4-(2-bromo-4-(2-chloro-1,1,2-trifluoroethoxy)-6-tert.-butylphenoxy)butyryl bromide, having a molecular weight of 510.6;

3-bromo-5-chloro-2-(2,2-dichloro-1,1-difluoroethylthio)phenylthio acetyl fluoride, having a molecular weight of 448.6;

3-(3-(2,2,2-trichloro-1,1-difluoroethoxy)-2-iodo-4-tert.-butyl-6-nitrophenoxy)-2-isopropylpropionyl chloride, having a molecular weight of 637.1;

4-bromo-3-(pentafluoroethoxy)-2,6-dinitrophenylthio acetyl chloride, having a molecular weight of 489.7;

3-(2-bromo-4-chloro-5-(2,2-dibromo-1,1-difluoroethylthio)-6-iodophenoxy)propionyl bromide, having a molecular weight of 722.1; and 3-(2-(2,2-dichloro-1,1-difluoroethoxy)-3,5-dipropylphenoxy)butyryl chloride, having a molecular weight of 431.9.

EXAMPLE 9

A solution of 2-chloro-5-(2,2-dichloro-1,1-difluoroethoxy)phenoxy acetyl chloride (1.77 grams; 0.005 mole) in 10 milliliters of acetonitrile was added to a solution of cyanamide (0.5 gram; 0.01 mole) in 10 milliliters of acetonitrile. The resulting reaction mixture was agitated at ambient temperatures for a period of about 16 hours and then filtered. The filtrate was treated with 25 milliliters of water and 50 milliliters of methylene chloride and the aqueous layer separated and extracted with additional methylene chloride (two 25 milliliter portions). The methylene chloride extracts were combined, washed with water, dried over magnesium sulfate and evaporated under reduced pressure to obtain the product as a solid residue. Recrystallization of the product residue from a methylene chloride/hexane mixture (1:2) gave the desired 2-chloro-5-(2,2-dichloro-1,1-difluoroethoxy)phenoxy-N-cyanoacetamide product as a crystalline solid having a melting point of 131°–132°C.

EXAMPLE 10

A solution of ethyl 2-chloro-5-(2,2-dichloro-1,1-difluoroethoxy)phenoxyacetate (8.8 grams; 0.02 mole) in 10 milliliters of methanol was cooled to about 5°C. and 58 percent concentrated ammonium hydroxide (50 milliliters) was added dropwise thereto over a period of about 10 minutes. The resulting reaction mixture was agitated for about 16 hours at ambient temperatures and filtered. The solids obtained by filtration were dissolved in 100 milliliters of methylene chloride and the aqueous filtrate extracted four times with twenty-five milliliter portions of methylene chloride. The methylene chloride portions were combined and washed twice with 50 milliliter portions of water, dried over magnesium sulfate, and concentrated in vacuo to a volume of approximately 40 milliliters. Hexane (100 milliliters) was added and the resultant crystalline precipitate filtered off and recrystallized from a methylene chloride/hexane mixture (1:2). As a result of these operations, the desired 2-chloro-5-(2,2-dichloro-1,1-difluoroethoxy)phenoxyacetamide was obtained as a crystalline solid having a melting point of 121°–121.5°C.

In a manner similar to that described in Examples 9 and 10, there are obtained, inter alia, the following products of Formula (IE) by the reaction of an appropriate substituted acetate or acetyl halide compound of Formulas (IA) and (ID) with an amide or amine reactant:

N,N-dibutyl-2-(2-chloro-5-(2,2-dichloro-1,1-difluoroethoxy)phenoxy)acetamide, having a molecular weight of 446.7;

N,N-bis(2-hydroxyethyl)-3-(2,4,6-tribromo-3-(2-bromo-1,1,2-trifluoroethoxy)phenylthio)propionamide, having a molecular weight of 682.9;

N-amyl-4-(2-(2,2,2,-trichloro-1,1-difluoroethylthio)-3,5-diiodophenoxy)-N-isohexylbutyramide, having a molecular weight of 700.5;

N-(6-hydroxyhexyl)-3-(3-bromo-5-chloro-2-(2,2-dichloro-1,1-difluoroethylthio)phenoxy)-2-tert.-butylpropionamide, having a molecular weight of 599.7;

N,N-diethyl-5-(3-(2-bromo-1,1,2-trifluoroethoxy)-2-iodo-4-nitro-6-tert.-butylphenylthio)-4-methylvaleramide, having a molecular weight of 556.3;

N-(3-hydroxypropyl)-3-(4-bromo-3-(pentafluoroethoxy)-2,6-dinitrophenoxy)propionamide, having a molecular weight of 526.3;

N-methyl-N-(2-hydroxyethyl)-2-(2-bromo-4-chloro-3-(2,2,2-tribromo-1,1-difluoroethylthio)-6-iodophenoxy)acetamide, having a molecular weight of 749.5;

N,N-dipropyl-3-(2-(2,2-dichloro-1,1-difluoroethoxy)-3,5-diisopropylphenoxy)-2-isopropylpropionamide, having a molecular weight of 524.6;

N-(5-hydroxyamyl)-2-(4-(2,2,2-tribromo-1,1-difluoroethoxy)-2,6-difluorophenoxy)acetamide, having a molecular weight of 590.0; and N-isohexyl-3-(4-(pentafluoroethoxy)-2-iodo-4-tert.-butylphenylthio)-2-methylpropionamide, having a molecular weight of 595.3;

The products of the present invention are suitable for use as herbicides, fungicides and insecticides. For such uses, the unmodified substance can be utilized. However, the present invention also embraces the use of compounds in a formulation. Thus, for example, a compound can be dispersed on a finely divided solid and employed therein as a dust. Also, the compounds, or a solid composition comprising the compound, can be dispersed in water, typically with the aid of a wetting agent, and the resulting aqueous suspension employed as a spray. In other procedures, the compound can be employed as a constituent of organic liquid compositions, oil-in-water and water-in-oil emulsions, or water dispersions, with or without the addition of wetting, dispersing or emulsifying agents.

It is to be understood, however, that all of the compounds claimed and compositions containing them may not be equally effective at similar concentrations or against the same plants, insects or fungal organisms. The exact concentration of the toxic substituent to be employed in the treating compositions is not critical and may vary considerably provided the plant, insect or fungal organism and/or their respective habitats are contacted with an effective amount of toxicant. The concentration of the toxicants in liquid compositions generally is from about 1.0 to about 50 percent by weight. Concentrations up to about 95 weight percent are often employed. In dusts or dry formulations, the concentration of the toxicant can be from about 1.0 to about 10 weight percent; however, concentrations up to about 95 weight percent are often conveniently employed. In compositions to be employed as concentrates, the toxicant can be present in a concentration of from about 5 to about 98 weight percent.

In representative operations, each of the ethyl 2-chloro-5-(2,2-dichloro-1,1-difluoroethoxy)phenoxyacetate, ethyl 4-(2,2-dichloro-1,1-difluoroethoxy)-2-nitrophenoxyacetate, ethyl 3-(2-bromo-1,1,2-trifluoroethoxy)phenoxyacetate and ethyl 4-chloro-2-(2,2-dichloro-1,1-difluoroethoxy)phenoxyacetate compounds gives complete control of Trichophyton mentagrophytes when such organisms are contacted with compositions containing one of the above-named compounds at a concentration of 500 parts per million by weight.

In additional representative operations, ethyl 4-(and 5-)-tert.-butyl-2-(2,2-dichloro-1,1-difluoroethoxy)-phenoxyacetate (1:1 mixture of isomers) gives complete control of copper and black blowflies when such insects are contacted with compositions containing the above compound at a concentration of 100 parts per million by weight.

In further representative operations, representative compounds of the present invention were employed at a dosage rate of 20 pounds per acre for evaluation in the pre-emergent control of various plant species. The percent control of the various plant species at the employed dosage rate of the representative compounds is set forth in the following table:

Percent Pre-Emergent Control of Seed Germination
At 20 pounds per acre

| Run No. | Compound | Weed species | | |
|---|---|---|---|---|
| | | Pig-weeds | Bind-weeds | Wild Mustard Charlock |
| 1. | Ethyl 3-(2,2-dichloro-1,1-difluoroethoxy)phenoxyacetate | 100 | 100 | 100 |
| 2. | Ethyl 4-(2,2-dichloro-1,1-difluoroethoxy)phenoxyacetate | 100 | 50 | 95 |
| 3. | Ethyl 2-chloro-5-(2,2-dichloro-1,1-difluoroethoxy)phenoxyacetate | 100 | 100 | 100 |
| 4. | Ethyl 2,4,6-trichloro-3-(2,2-dichloro-1,1-difluoroethyl)-phenoxyacetate | 100 | 0 | 0 |
| 5. | Potassium 2-chloro-5-(2,2-dichloro-1,1-difluoroethoxy)-phenoxyacetate | 100 | 100 | 100 |
| 6. | 2-chloro-5-(2,2-dichloro-1,1-difluoroethoxy)phenoxy acetic acid | 100 | 100 | 100 |
| 7. | 1:1 complex of 2-chloro-5-(2,2-dichloro-1,1-difluoroethoxy)phenoxy acetic acid with potassium 2-chloro-5-(2,2-dichloro-1,1-difluoroethoxy)phenoxyacetate | 100 | 100 | 100 |
| 8. | Ethyl 2-bromo-5-(2,2-dichloro-1,1-difluoroethoxy)phenoxyacetate | 100 | 100 | 100 |
| 9. | Ethyl 2-(2,2-dichloro-1,1-difluoroethoxy)phenoxyacetate | 100 | 95 | 100 |
| 10. | Ethyl 3-(2-bromo-1,1,2-trifluoroethoxy)phenoxyacetate | 100 | 100 | 100 |
| 11. | Ethoxy 4-chloro-2-(2,2-dichloro-1,1-difluoroethoxy)phenoxyacetate | 100 | 90 | 100 |
| 12. | Butyl 2-chloro-5-(2,2-dichloro-1,1-difluoroethoxy)phenoxyacetate | 100 | 100 | 100 |
| 13. | Ethyl 2-(2-chloro-5-(2,2-dichloro-1,1-difluoroethoxy)-phenoxypropionate | 100 | 100 | 100 |
| 14. | Isooctyl 2-chloro-5-(2,2-dichloro-1,1-difluoroethoxy)-phenoxyacetate | 100 | 100 | 100 |
| 15. | 2-(Isobutoxy)-1-methylethyl 2-chloro-5-(2,2-dichloro-1,1-difluoroethoxy)phenoxyacetate | 100 | 100 | 100 |

Table —Continued
Percent Pre-Emergent Control of Seed Germination
At 20 pounds per acre

| Run No. | Compound | Weed species | | |
|---|---|---|---|---|
| | | Pig-weeds | Bind-weeds | Wild Mustard Charlock |
| 16. | Ethyl 4-(2-chloro-5-(2,2-di-chloro-1,1-difluoroethoxy)-phenoxybutyrate | 100 | 75 | 30 |
| 17. | Ethyl 2(and 6)-(2,2-dichloro--1,1-difluoroethoxy)-p(and -m)-tolyloxyacetate | 100 | 100 | 100 |
| 18. | Ethylene bis(2-chloro-5-(2,2--dichloro-1,1-difluoroethoxy)-phenoxyacetate) | 100 | 100 | 100 |
| 19. | 2-(2-chloro-5-(2,2-dichloro-1,1-difluoroethoxy)phenoxy)-N-cyanoacetamide | 100 | 100 | 100 |
| 20. | difluoroethoxy)phenoxy acetyl chloride | 100 | 100 | 100 |
| 21. | 2-aminoethanol salt of 2-chloro-5-(2,2-dichloro-1,1-difluoro-ethoxy)phenoxy acetic acid | 100 | 100 | 100 |
| 22. | Dibutylamine salt of 2-chloro-5-(2,2-dichloro-1,1-difluoro-ethoxy)phenoxy acetic acid | 100 | 100 | 100 |
| 23. | dimethylamine salt of 2-chloro--5-(2,2-dichloro-1,1-difluoro-ethoxy)phenoxy acetic acid | 100 | 100 | 100 |

In further additional operations, N,N-dibutyl-2-(2-chloro-5-(2,2-dichloro-1,1-difluoroethoxy)phenoxy)-acetamide gives substantially complete control of wild oats when such plants are contacted with compositions containing the named compound at a dosage rate of 20 pounds per acre.

The substituted haloalkoxy- or haloalkylthio-phenol or thiophenol compounds employed as starting materials in the preceding reaction are prepared by halogenating or nitrating a corresponding unsubstituted haloalkoxy- or haloalkylthio- phenol or thiophenol compound or a fluoro and/or loweralkyl substituted haloalkoxy- or haloalkylthio- phenol or thiophenol compound.

The addition of the halogenating or nitrating agent is conveniently carried out in the presence of an inert solvent, such as, for example, acetone, carbon tetrachloride, methylene chloride and the like, at temperatures of from about 0° to about 60°C. over a period of from about 10 minutes to about three hours. Ordinarily, a small amount of an actuating agent, e.g., ferric chloride, aluminum chloride, iodine and the like, is incorporated into the reaction mixture in order to decrease reaction time. Following the addition of the halogenating or nitrating agent, the reaction mixture is agitated at ambient temperatures for a period of from about 1 to about 18 hours, filtered, and washed with water, dilute hydrochloric acid, and the like and dried. Evaporation of the reaction mixture under reduced pressure leaves the desired product as a solid or viscous residue which can be further purified by employing conventional techniques.

The unsubstituted haloalkoxy- or haloalkylthio-phenol or thiophenol compounds employed in the halogenating and nitrating reactions above can be prepared by known or analogous procedure disclosed in the literature. For example, 3-(2,2-dichloro-1,1-difluoroethoxy)phenol is prepared by the reaction of resorcinol, 1,1-dichloro-2,2-difluoroethylene and potassium hydroxide in the presence of acetone. The 1,1-dichloro-2,2-difluoroethylene reactant is usually sparged into a mixture of the other reactants at a temperature of from about 0° to about 10°C. over a period of about 2 hours. Following the completion of the reaction, the solvent is removed by evaporation under reduced pressure and the residue thus obtained is dissolved in 10 percent aqueous potassium hydroxide and subsequently filtered. The aqueous solution is acidified with dilute hydrochloric acid, extracted with carbon tetrachloride and the extract dried over magnesium sulfate. Removal of the carbon tetrachloride solvent by distillation gives the desired 3-(2,2-dichloro-1,1-difluoroethoxy)phenol product as an oil having a boiling point of 108°–109°C. at 0.2 millimeters of Hg.

The loweralkyl substituted haloalkoxy- or haloalkylthio- phenol or thiophenol starting materials are prepared in analogous procedures by reacting a loweralkyl substituted catechol, resorcinol or hydroquinone compound with a substituted difluoroethylene compound.

The fluoro or fluoro and loweralkyl substituted haloalkoxy- or haloalkylthio- phenol or thiophenol compounds employed in the halogenating and nitrating reactions above are prepared by introducing the fluorine atom into the ring prior to the preparation of the ether. These compounds are prepared from a fluoro or fluoro and loweralkyl substituted catechol, resorcinol or hydroquinone compound according to the procedures set forth in Illinois State Geological Circular No. 199, pp. 15 (1955). Other modes of substitution are readily arrived at by the synthesis of ortho-, meta-, or para-fluoro substituted-(2,2-dihalo-1,1-difluoroethoxy)-benzene compounds from the corresponding fluorophenols followed by nitration, reduction, diazotization, hydrolysis and the like.

Compounds containing the $CX_3CF_2Y-$ moiety wherein X represents bromo or chloro, are readily prepared by photochemically halogenating known compounds of the type

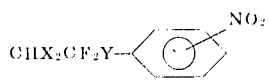

(see Lichtenberger, et al., Bull, Soc. Chim. Fr., 4, 581–596 (1957) with an appropriate halogenating agent, such as, for example, $Cl_2$, ClBr and the like, in the presence of a solvent such as carbon tetrachloride or a heterogeneous mixture employing water.

The compounds wherein X is fluoro are prepared by reacting the compounds wherein X is bromo or chloro with a molten antimony fluoro-chloro compound at a temperature of from about 80°–120°C. for a period of from about one half to about 2 hours.

The resulting halo substituted compounds of the above formula are readily reduced to the corresponding anilines with various reducing agents, such as, for example, zinc-hydrochloric acid, hydrogen-Raney nickel, and the like. The anilines are then reacted with sodium nitrite to form diazonium salts which are readily hydrolyzed to the corresponding phenols or thiophenols.

Secondary substituents on the ring may, depending upon the resistance of the substituent to the succeeding reactions, be introduced at various points in the reaction sequence or introduced after the phenol or thiophenol is obtained.

We claim:
1. A compound corresponding to the formula:

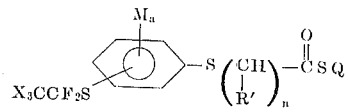

wherein
each X independently represents hydrogen, bromo, chloro or fluoro, with the proviso that at least one X is always bromo, chloro or fluoro;
each M independently represents bromo, chloro, fluoro, iodo, nitro or loweralkyl containing from one to about four carbon atoms, both inclusive;
$a$ represents an integer of from 0 to 3, both inclusive;
each $n$ independently represents an integer of from 1 to 5, both inclusive;
R' represents hydrogen or loweralkyl containing from one to about four carbon atoms, both inclusive, with the proviso that when $n$ is greater than 1, only one R' can be loweralkyl;
Q is loweralkyl containing from one to about 1 to about 10 carbon atoms wherein Q is hydrogen with compounds wherein Q is sodium or potassium.

2. The compound of claim 1 wherein $a$ is 1.
3. The compound of claim 1 wherein Q is loweralkyl of from one to about 10 carbon atoms, both inclusive.

* * * * *

UNITED STATES PATENT OFFICE
CERTIFICATE OF CORRECTION

Patent No. 3,862,974                    Dated   January 28, 1975

Inventor(s)  Fred Y. Edamura; Lennon H. McKendry; Eric R. Larsen

It is certified that error appears in the above-identified patent and that said Letters Patent are hereby corrected as shown below:

In the Abstract, the second formula should appear as follows:

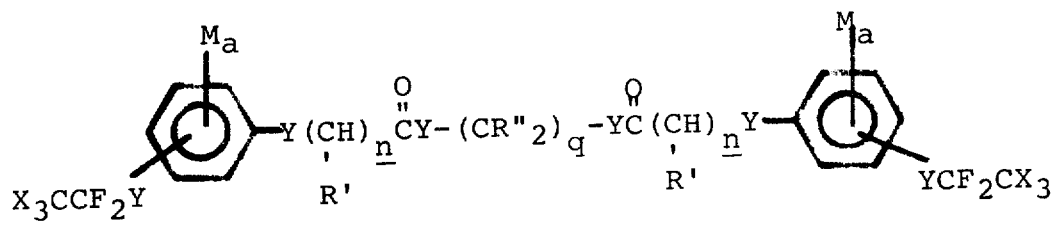

Column 1, line 2, after February 1, 1971, insert -- now U. S. Patent No. 3,709,926. --

Column 1, line 25, insert the word "and" between above and succeeding;

Column 1, lines 45-60, the formulas should appear as follows:

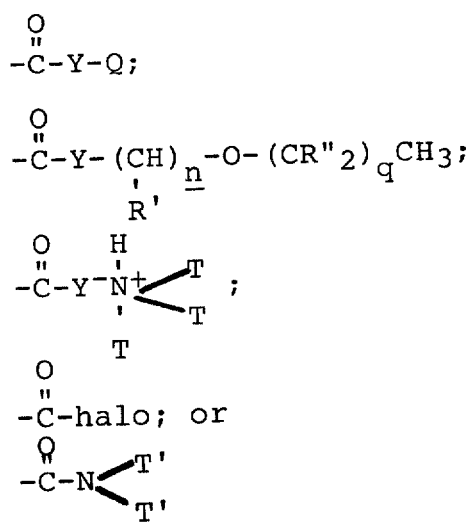

Page 2

PO-1050
(5/69)

UNITED STATES PATENT OFFICE
CERTIFICATE OF CORRECTION

Patent No. 3,862,974      Dated January 28, 1975

Inventor(s) Fred Y. Edamura; Lennon H. McKendry; Eric R. Larsen

It is certified that error appears in the above-identified patent and that said Letters Patent are hereby corrected as shown below:

Column 2, line 11, insert the word "or" between sodium and potassium;

Column 2, line 52, delete the comma after loweralkyl and insert a period ".";

Column 3, line 10, correct spelling of "chromatography";

Column 4, line 60, insert the word "and" between water and methylene;

Column 5, line 20, correct spelling of "followed";

Column 6, line 53, correct spelling of "haloalkoxy";

Column 7, line 8, change "0.5" to -- 0.05 --;

Column 7, line 47, correct spelling of "difluoroethoxy";

Column 7, line 56, correct spelling of "tribromo";

Column 7, line 62, correct spelling of "tribromo";

Column 8, line 55, change "1051.77" to -- 1051.47 --;

Column 14, Run No. 4, the compound should read as follows -- Ethyl 2,4,6-trichloro-3-(2,2-dichloro-1,1-difluoroethoxy)-phenoxyacetate --;

UNITED STATES PATENT OFFICE
CERTIFICATE OF CORRECTION

Patent No. 3,862,974      Dated January 28, 1975

Inventor(s) Fred Y. Edamura; Lennon H. McKendry; Eric R. Larsen

It is certified that error appears in the above-identified patent and that said Letters Patent are hereby corrected as shown below:

Column 14, Run No. 11, the compound should read as follows
-- Ethyl 4-chloro-2-(2,2-dichloro-1,1-difluoroethoxy)phenoxy-acetate --;

Column 15, Run No. 20, the compound should read as follows
-- 2-chloro-5(2,2-dichloro-1,1-difluoroethoxy)phenoxy acetyl chloride --;

Column 18, line 20, delete "one to about";

Signed and sealed this 24th day of June 1975.

(SEAL)
Attest:

RUTH C. MASON
Attesting Officer

C. MARSHALL DANN
Commissioner of Patents
and Trademarks